Figure 1:
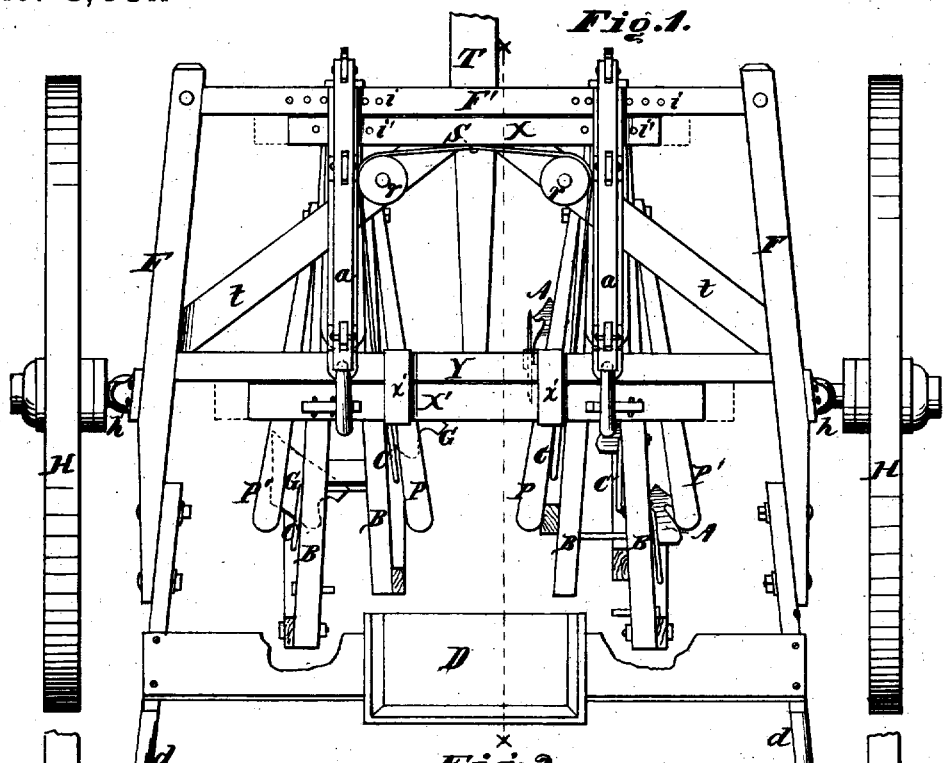

2 Sheets--Sheet 1.

C. M. & D. E. HALL.

Cultivators.

No. 5,601. Reissued Oct. 14, 1873.

Witnesses.
H. L. Ferrine,
Geo. M. Smith Jr.

Inventors.
Cyrus M. Hall
By Am Stout
Attorney

AM. PHOTO-LITHOGRAPHIC Co. N.Y. (OSBORNE'S PROCESS.)

2 Sheets--Sheet 2.

C. M. & D. E. HALL.

Cultivators.

No. 5,601. Reissued Oct. 14, 1873.

Witnesses.
H. L. Perrine
Alex. M. Pott Jr.

Inventors.
Cyrus M. Hall
By A. M. Stout
Attorney

A.M. PHOTO-LITHOGRAPHIC Co. N.Y. (OSBORNE'S PROCESS)

UNITED STATES PATENT OFFICE

CYRUS M. HALL AND DAVID E. HALL, OF UNIONTOWN, ILLINOIS; SAID DAVID E. HALL ASSIGNOR TO SAID CYRUS M. HALL.

IMPROVEMENT IN CULTIVATORS.

Specification forming part of Letters Patent No. 27,627, dated March 27, 1860; reissue No. 5,601, dated October 14, 1873; application filed January 5, 1872.

*To all whom it may concern:*

Be it known that CYRUS M. HALL and D. E. HALL, both of Uniontown, in the county of Knox, in the State of Illinois, invented certain Improvements in Cultivators, of which the following is a specification:

It is here premised, generally, that the improvements hereinafter described relate to a cultivator, which has a frame consisting of at least two side pieces, upon the outer side of each of which is fastened a journal or axle for a wheel, (the machine being carried upon two wheels,) and at least two cross-pieces—one in front and the other nearly midway from front to rear, and nearly in line with the axles of the wheels—and which has a beam with a gang of plows or blades on each side, so as to leave a central space between them for the row of plants to be cultivated, and which has two handles and a driver's seat, and is easily changed from a walking to a riding machine, and vice versa.

The first part of said invention relates to the construction and mounting of a wheel or revolving shield, whose periphery and arms are provided with sharp cutting-edges, and which revolves vertically near to or against one side of the blade before mentioned. The object of this device is to cut and break sods and lumps, and to protect young plants from being broken or covered up by the soil displaced by the blade.

The second part of said invention relates to the construction and combination of the pivot-bolt above mentioned, and certain bars through which that bolt passes, and another bolt passing through the rear ends of these bars and the central cross-piece of the frame or the axle-tree of the machine, the result of which is that the whole constitutes a frame, which swings freely to the right and left on said rear bolt as a pivot; and the front end of the beam being pivoted for lateral and vertical motion upon the forward bolt, the forward end of the beam is moved laterally or vertically, and the draft exerted by the team is wholly sustained and perfectly equalized by the said axle or central cross-piece, all of which will be more fully described hereinafter.

The third part of said invention relates to the combination of a sliding bar, which is sustained, near each end thereof, by a roller mounted upon a suitable bearing upon the rear face of the said central cross-piece or axle-tree, with two vertical pendent posts inserted through and fastened to that sliding bar in such a manner that when the two double beams, hereinafter described, have each one of these pendent posts to extend down between the two single bars of which it is composed, both beams can be moved laterally to the right or left by simply sliding that bar to the right or left on its bearing, and each beam shall have free vertical motion independent of the other.

The fourth part of said invention relates to the combination of a front sliding bar, placed near to and parallel to the front cross-piece of the main frame, which sliding bar is attached to each one of the draft-frames or braces, before mentioned, by means of the forward pivot or hitch bolt mentioned, and certain levers placed one on top of each draft-brace. The result of this combination is that by operating such levers the said slide-bar can be made to move and carry the forward ends of the beams to the right or left at will, and can be raised and lowered, each independently of the other, all of which will be more fully described hereinafter.

Figure 2:
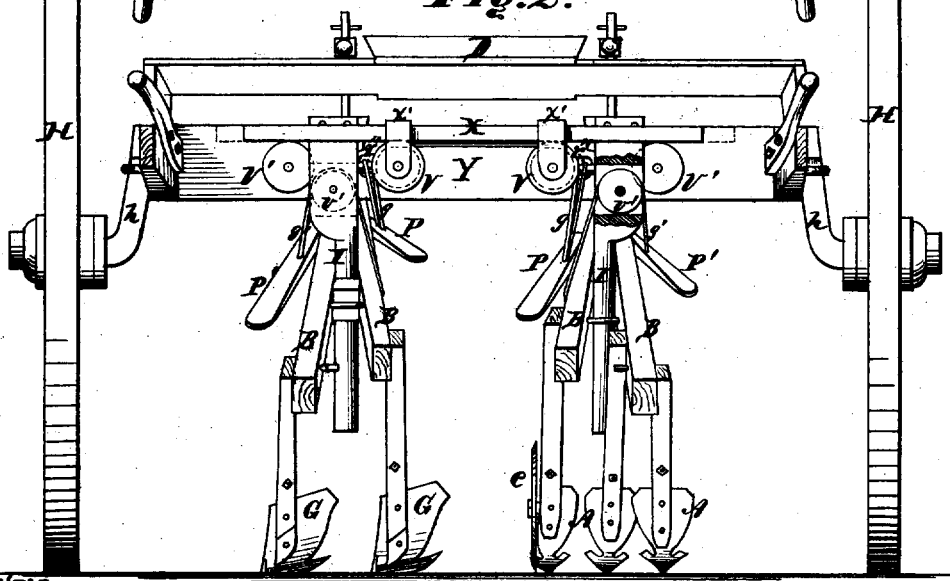
Figure 3:
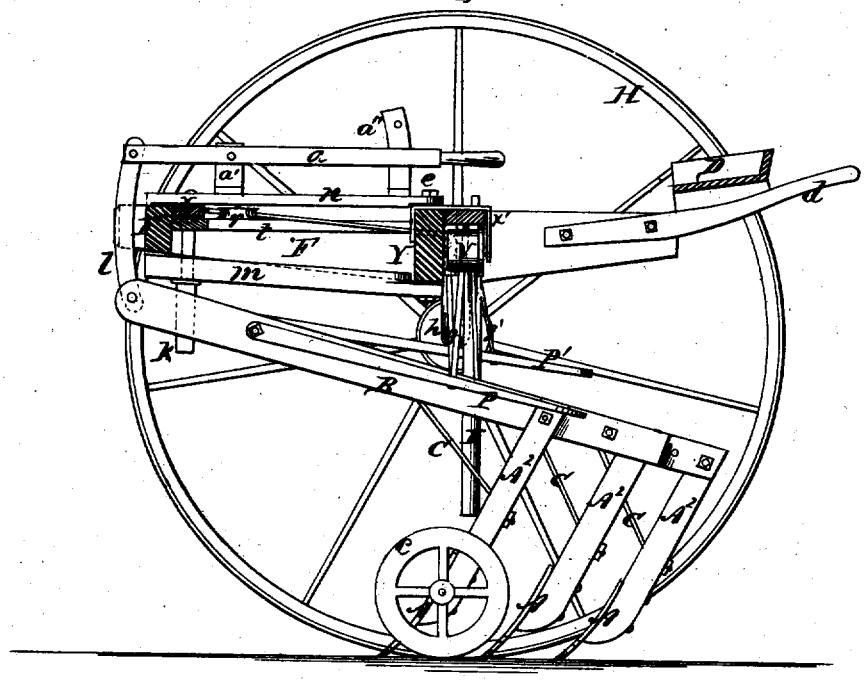
Figure 4:
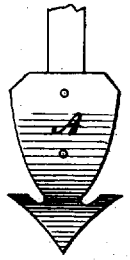
Figure 5:
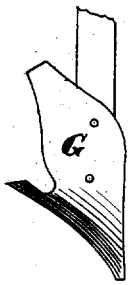

In the accompanying drawings, Figure 1 represents a top or plan view of a cultivator embracing said improvements; Fig. 2, a rear-end view of the same; Fig. 3, a vertical central longitudinal sectional view of the same; Fig. 4, a front view of the shovel-formed blade, and Fig. 5 a like view of a blade in the share form.

F F are the side pieces of the main frame. F′ is the front cross-piece thereof; Y, the central cross-piece or axle-tree; *h h*, the journals; H H, the wheels; T, the tongue; *d d*, the handles; D, the seat, which, as well as the handles, is removable at convenience. The cutting-wheel or shield C, as shown in Fig. 3, and the two forms of plows or blades (shown in Figs. 4 and 5) have already been sufficiently described. Each of the beams is composed of the two bars B B, which are fastened together at the front end, at just a sufficient distance apart to allow of free lateral and vertical play upon the hitch-bolt K, from which the beam receives its draft.

The draft-braces *m* and *n* are confined together at their rear ends by the bolt *e*, which passes down through bar *n*, the axle-tree Y, and bar *m*, and at their front ends by the hitch-bolt K, so that when they swing freely to the right and left on the bolt *e*, as a hinge or pivot, one above and the other below the front cross-bar F′, and by inserting a pin in any of the series of holes in that cross-bar and through them, the lateral motion of front end of the beam is prevented, while its vertical motion is left free. The front ends of the beams are coupled together by the sliding bar X, the hitch-bolt being inserted in any of the two series of holes therein, so as to confine the front ends at any desired distance apart. On the bar *n* is fixed two vertical posts, as shown. *a′* is the fulcrum of lever *a*, and *a″* passes up through a mortise in the lever *a*. The forward end of lever *a* is pivoted to a link, *l*, the lower end of which is pivoted to the point of the beam, the lever being pivoted on *a′*. The operator, by force applied to the handles of the levers, may move the ends of the beams to the right or left, or raise or depress them while sitting on the seat D.

Now as to the rear ends of the beams: The two bars B B of which the beam is composed are held just so far apart as to allow the post I to extend down between them, and have free vertical play, by a rod binding them together, as shown. The blades A and G are fastened to the standards $A^2$, which are bolted to the bars composing the beam, and braced by the rods C′ C′ C′. The upper ends of the posts I I are made with wide thin tenons, which pass up through suitable vertical mortises in the sliding bar X, and, by making the mortises, say, twice as long as the tenons are wide, and inserting wedges of different thicknesses in either side of the tenon, the distance apart of the posts, and consequently of the beams, can be regulated. To facilitate the lateral movement of the gangs the bar X is provided with the pulleys or rollers V′ V′.

It will be observed, however, that whatever may be the lateral position of the two beams, either is capable of vertical motion, with or without, and independent of, the other, and independent, likewise, of the lateral or vertical action or positions of the point ends thereof.

To facilitate the raising of the beam with its gang of blades up out of the ground, a strap, *g*, is fastened to the inner side of the inner bar of the beam, and is then extended over pulley *v′* mounted within the post I, as shown in Fig. 2, and thence down to treadle P′, and so by pressure from the foot from seat D the rear ends of either or both beams can be raised at will, so as to avoid obstructions in or upon the ground. The direction of the point ends of the beams may be changed by another means besides operating the lever *a*, as before described. Thus, the strap S is fastened to the front sliding bar X at its longitudinal center, and its two ends pass back over pulleys *r* and *r*, respectively, which are mounted on the diagonal bars *t t*, and back through axle-tree Y, and over the rollers mounted therein, and thence down the treadles P P, respectively, where they are fastened to them. Now, when the driver presses upon the left treadle with his foot the strap S draws the bar X, and with it the forward ends of both to the left, and when he depresses the right treadle the like movement is made to the right, the points of the beams only being moved while the aft ends automatically assume their natural lines of draft. The beams are interchangeable, and so likewise are the blades, and all the operative parts are adjustable in a high degree.

It will be observed that by the construction of the draft-braces and the hitch-bolt before described, the line of draft will always be on a level with the axle-tree Y, and that the necks of the animals drawing the machine will not be subjected to either an upward or downward pressure.

What is claimed as the said invention is—

1. In combination with the barbed share A, the revolving cutting-wheel or shield C, the periphery and arms of which have sharp cutting-edges, constructed and arranged substantially as shown and described, for the purpose set forth.

2. The combination of the hitch-bolt K, the bars *m* and *n*, the bolt *e*, and the axle-tree Y, and a suitable device for holding and operating the same as co-acting devices for rendering the point ends of the beams adjustable, both laterally and vertically independent of the motion of their rear ends and independent of each other, and for equalizing the draft of the machine, each constructed and all arranged substantially in the manner described and set forth.

3. The combination of the sliding bar *x*, provided with supports upon the rear face of the axle-tree Y and the pendent posts I I, as a device for communicating lateral motion to the ends of the plow-beams, and of allowing and guiding vertical motion thereof, independent of any motion of the front ends of the same, constructed and arranged substantially in the manner and for the purpose set forth.

4. The combination of the front sliding bar X, the front cross-piece F′, the bars *m* and *n*, hitch-bolt K, bolt *e*, the levers *a a* mounted and pivoted to the front ends of the beams, as shown by the link *l*, as co-acting devices for moving the front ends of the beams laterally, and of giving them vertical motion, either together or independently of each other, and independently of the motion of the aft ends of the beams, each constructed and all arranged substantially in the manner and for the purpose described and set forth.

C. M. HALL.

Witnesses:
W. N. ENGLAND,
D. W. SHERMAN.